(12) United States Patent
Suzuki et al.

(10) Patent No.: US 11,100,749 B2
(45) Date of Patent: Aug. 24, 2021

(54) GAMING DEVICE AND GAME CONTROL METHOD

(71) Applicant: SEGA SAMMY CREATION INC., Yokohama (JP)

(72) Inventors: Hirokazu Suzuki, Yokohama (JP); Seiji Kato, Yokohama (JP); Satoshi Arashima, Yokohama (JP)

(73) Assignee: SEGA SAMMY CREATION INC., Yokohama (JP)

( * ) Notice: Subject to any disclaimer, the term of this patent is extended or adjusted under 35 U.S.C. 154(b) by 30 days.

(21) Appl. No.: 16/484,564

(22) PCT Filed: Feb. 13, 2017

(86) PCT No.: PCT/JP2017/005130
§ 371 (c)(1),
(2) Date: Aug. 8, 2019

(87) PCT Pub. No.: WO2018/146811
PCT Pub. Date: Aug. 16, 2018

(65) Prior Publication Data
US 2020/0160650 A1    May 21, 2020

(51) Int. Cl.
*G07F 17/34* (2006.01)
*G07F 17/32* (2006.01)

(52) U.S. Cl.
CPC ...... *G07F 17/3213* (2013.01); *G07F 17/3258* (2013.01); *G07F 17/34* (2013.01)

(58) Field of Classification Search
CPC ... G07F 17/3213; G07F 17/3267; G07F 17/34
See application file for complete search history.

(56) References Cited

U.S. PATENT DOCUMENTS

| 6,142,875 A | * | 11/2000 | Kodachi | ............. | G07F 17/32 |
| | | | | | 273/121 B |
| 6,213,875 B1 | * | 4/2001 | Suzuki | ............. | G07F 17/3211 |
| | | | | | 273/121 B |

(Continued)

FOREIGN PATENT DOCUMENTS

| JP | 2004-236828 A | 8/2004 |
| JP | 2006-263319 A | 10/2006 |

(Continued)

*Primary Examiner* — Steven J Hylinski
(74) *Attorney, Agent, or Firm* — Faegre Drinker Biddle & Reath LLP (57) ABSTRACT

A gaming device comprises a control unit and a storage unit. The control unit is configured to sequentially display symbols included in a first set of a plurality of symbols comprising a specific symbol in each of a plurality of display areas to change displays of the symbols in the plurality of display areas, and stop the changes of the displays of the symbols at a predetermined timing; sequentially display symbols included in a second set of a plurality of symbols comprising the specific symbol in a higher proportion than in the first set of symbols in each of the plurality of display areas to change displays of the symbols in the plurality of display areas, and stop the changes of the displays of the symbols at a predetermined timing; and execute a predetermined performance when the symbols included in the second set of symbols are sequentially displayed.

7 Claims, 8 Drawing Sheets

(56) References Cited

U.S. PATENT DOCUMENTS

| | | | |
|---|---|---|---|
| 6,358,147 B1* | 3/2002 | Jaffe | G07F 17/3244 463/20 |
| 6,383,073 B1* | 5/2002 | Nagano | G07F 17/32 463/20 |
| 6,394,902 B1* | 5/2002 | Glavich | G07F 17/3244 463/20 |
| 6,398,217 B1* | 6/2002 | Shimizu | A63F 13/005 273/121 B |
| 6,852,031 B1* | 2/2005 | Rowe | G07F 17/32 235/375 |
| 8,398,474 B2* | 3/2013 | Acres | G07F 17/32 463/16 |
| 8,721,423 B2* | 5/2014 | Saito | G07F 17/3216 463/20 |
| 2002/0010016 A1* | 1/2002 | Tsukahara | G07F 17/3244 463/20 |
| 2005/0159211 A1* | 7/2005 | Englman | G07F 17/3267 463/25 |
| 2005/0239539 A1* | 10/2005 | Inamura | G07F 17/3265 463/20 |
| 2005/0261051 A1* | 11/2005 | Bennett | G07F 17/3267 463/20 |
| 2008/0119256 A1* | 5/2008 | Toyoda | G07F 17/3202 463/13 |
| 2008/0318667 A1 | 12/2008 | Saito | |
| 2010/0120516 A1* | 5/2010 | Wollner | G07F 17/3244 463/25 |
| 2012/0122532 A1* | 5/2012 | Berman | G07F 17/3267 463/11 |
| 2015/0087388 A1* | 3/2015 | Itagaki | G07F 17/34 463/20 |
| 2015/0099569 A1 | 4/2015 | Suda | |

FOREIGN PATENT DOCUMENTS

| | | |
|---|---|---|
| JP | 2009-000450 A | 1/2009 |
| JP | 2014-054396 A | 3/2014 |
| JP | 2016-165408 A | 9/2016 |

* cited by examiner

GAMING DEVICE AND GAME CONTROL METHOD

CROSS-REFERENCE TO RELATED APPLICATIONS

This application is the U.S. national phase of the International Patent Application No. PCT/JP2017/005130 filed Feb. 13, 2017, the entire content of which is incorporated herein by reference.

TECHNICAL FIELD

The present disclosure relates to a gaming device and a game control method.

BACKGROUND

In recent years, various gaming devices have been developed. For example, Japanese Patent Publication JP-A-2014-054396 discloses a reel game (slot game) in which reels to be used can be changed to other reels having different display symbols according to conditions.

When the reel is changed in the reel game, the winning probability of the game changes according to the symbols displayed on the reel. Therefore, it is a matter of great interest to the player whether or not the reel spinning (rotating) during the game is a reel with a high probability of winning. The player may determine whether the winning probability of the reel game being played is high or not by staring at the symbols displayed on the spinning reels.

SUMMARY

However, it may be difficult to determine the possibility of winning a game by staring at the reels.

The present disclosure has been made in view of the foregoing, and an object thereof is to provide a technique relating to a game that allows the player to more easily determine the possibility of winning the game.

A gaming device according to an embodiment is a gaming device comprising a control unit, a storage unit, and a display unit. The control unit is configured to implement, by executing a program stored in the storage unit, sequentially displaying symbols included in a first set of a plurality of symbols comprising a specific symbol in each of a plurality of display areas to change displays of the symbols in the plurality of display areas, and stopping the changes of the displays of the symbols at a predetermined timing; sequentially displaying, when a predetermined condition is satisfied, symbols included in a second set of a plurality of symbols comprising the specific symbol in a higher proportion than in the first set of symbols in each of the plurality of display areas to change displays of the symbols in the plurality of display areas, and stopping the changes of the displays of the symbols at a predetermined timing; and executing a predetermined performance when the symbols included in the second set of symbols are sequentially displayed.

A game control method according to an embodiment is a method implemented in a gaming device comprising a control unit and a storage unit. The method comprises, by the control unit executing a program stored in the storage unit, sequentially displaying symbols included in a first set of a plurality of symbols comprising a specific symbol in each of a plurality of display areas to change displays of the symbols in the plurality of display areas, and stopping the changes of the displays of the symbols at a predetermined timing; sequentially displaying, when a predetermined condition is satisfied, symbols included in a second set of a plurality of symbols comprising the specific symbol in a higher proportion than in the first set of symbols in each of the plurality of display areas to change displays of the symbols in the plurality of display areas, and stopping the changes of the displays of the symbols at a predetermined timing; and executing a predetermined performance when the symbols included in the second set of symbols are sequentially displayed.

A recording medium according to an embodiment is a non-transitory recording medium storing a program for implementing a game control method in a gaming device comprising a control unit. The game control method comprises, by the control unit executing the program, sequentially displaying symbols included in a first set of a plurality of symbols comprising a specific symbol in each of a plurality of display areas to change displays of the symbols in the plurality of display areas, and stopping the changes of the displays of the symbols at a predetermined timing; sequentially displaying, when a predetermined condition is satisfied, symbols included in a second set of a plurality of symbols comprising the specific symbol in a higher proportion than in the first set of symbols in each of the plurality of display areas to change displays of the symbols in the plurality of display areas, and stopping the changes of the displays of the symbols at a predetermined timing; and executing a predetermined performance when the symbols included in the second set of symbols are sequentially displayed.

According to the present disclosure, it is possible to provide a technique related to a game that allows the player to more easily determine the possibility of winning the game.

BRIEF DESCRIPTION OF DRAWINGS

Various embodiments are illustrated in the drawings, in which.

DETAILED DESCRIPTION

An embodiment of the present disclosure will be described below with reference to the drawings. However, the embodiment described below is merely an example, and there is no intention to exclude the application of various modifications and techniques not explicitly described below. That is, the present disclosure can be implemented with various modifications or combinations of the examples, etc. without departing from the scope of the disclosure. Further, in the following description of the drawings, the same or similar parts are denoted by the same or similar reference numerals. The drawings are schematic and do not necessarily correspond to actual dimensions, ratios, and the like. Between mutual drawings, portions different in relation of their dimensions and ratios may also be included.

Hardware Configuration Example of Gaming Device

Figure 1:
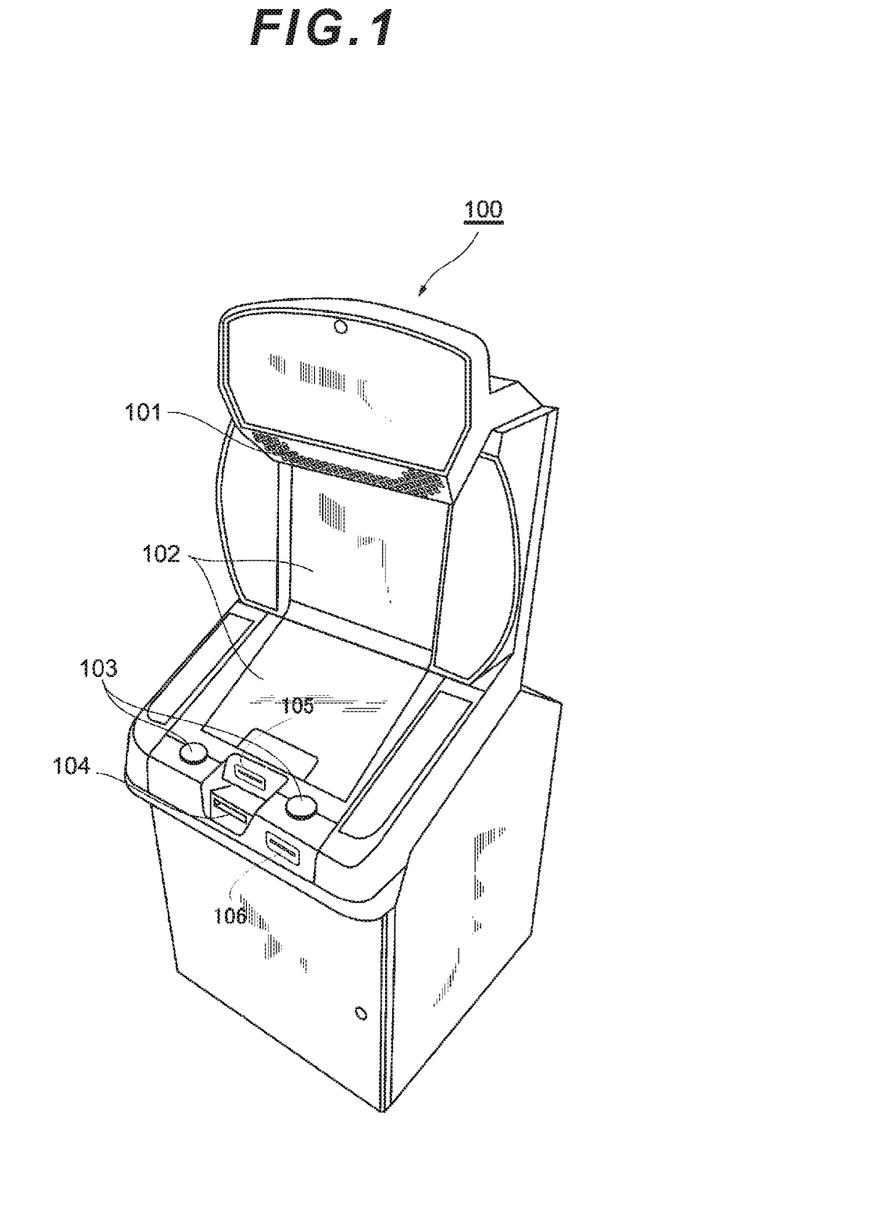
FIG. 1 is an external perspective view of a gaming device according to one embodiment.

FIG. 1 is an external perspective view of a gaming device according to an embodiment. The gaming device 100 illustrated in FIG. 1 is a gaming device installed in a casino, an amusement facility, or the like. In the present embodiment, a player can play a reel game (slot game) with the gaming device 100.

As illustrated in FIG. 1, the gaming device 100 comprises a speaker 101, a plurality of display devices 102, a plurality of operation buttons (hereinafter referred to as the "operation input device" 103), a card reading device 104, a Bill depositing device 105, and a ticket payout device 106 in appearance. The speaker 101 is sound output means for outputting voice guidance and effect sound of a game. The display device 102 is a display means for displaying images (for example, still images, moving images, videos, etc.) for expressing or presenting the game. The operation input device 103 is composed of a plurality of buttons, and comprises buttons for inputting an instruction from the player to the gaming device. Further, in the present embodiment, a touch panel serving as the operation input device 103 is disposed integrally with the display device 102, and the touch panel can receive an operation instruction according to the coordinates of a position where the player touches a display unit of the display device 102. It is noted that the operation input device 103 is not limited to such a configuration, and any configuration may be adopted as long as the configuration allows the player to input instructions. The card reading device 104 is a card reader that reads information from a card owned by the player. The Bill depositing device 105 is a device that reads an inserted bill or a ticket. The ticket payout device 106 is a ticket output means for paying out a card to the player.

The card to be read by the card reading device 104 is a medium in which gaming history information of the player is stored. In the card, for example, points and the like acquired depending on gaming conditions of the player can be additionally stored. The player can obtain various services depending on the information stored in the card, but the contents stored in the card do not affect the gamming result.

Further, the gaming device 100 comprises a computing device therein as a control device that totally controls the gaming device 100.

Figure 2:
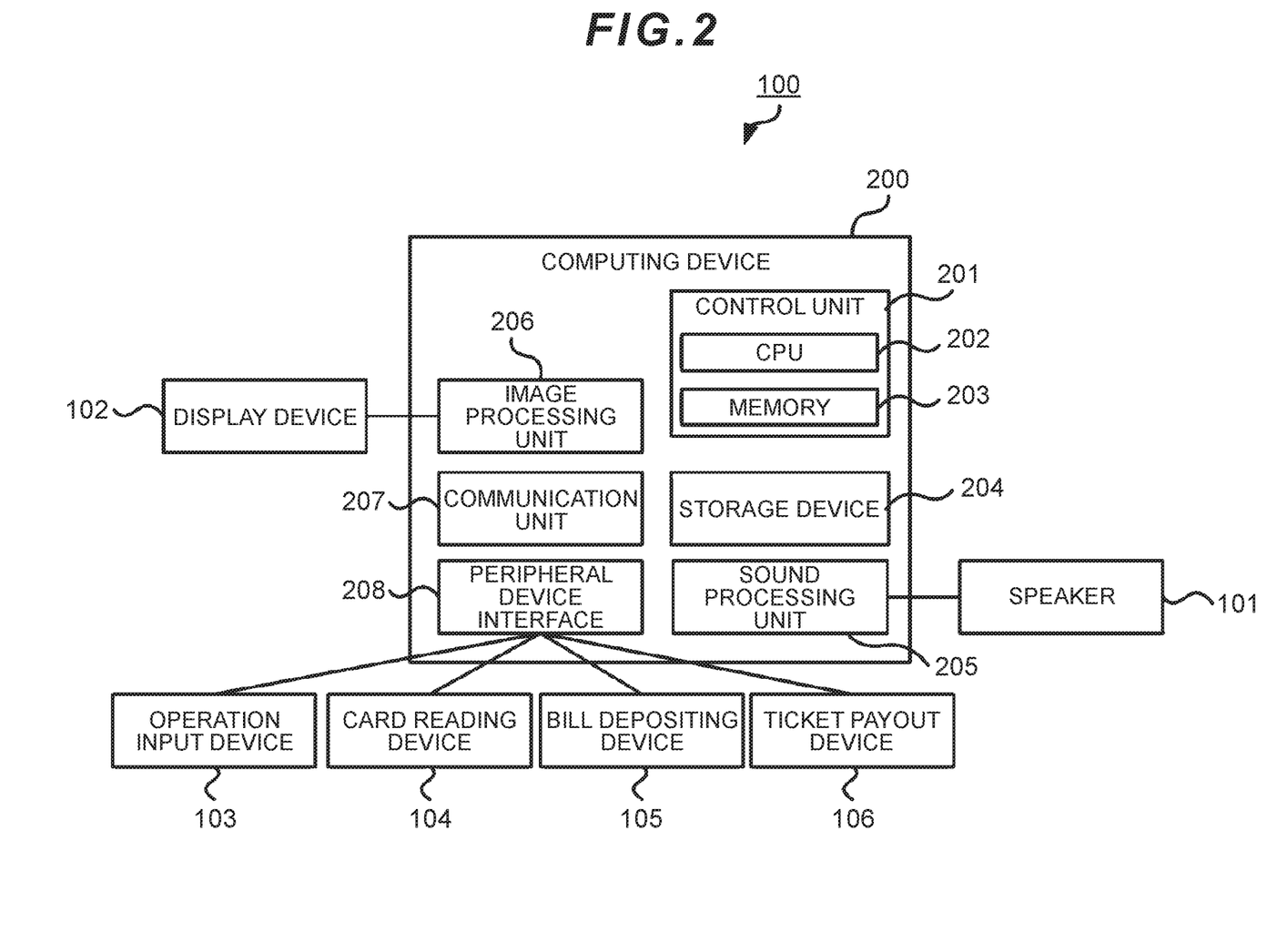
FIG. 2 is a block diagram illustrating a main hardware configuration of a gaming device according to one embodiment.

With reference to FIG. 2, an example of the hardware configuration of a computing device 200 included inside the gaming device 100 will be described. As illustrated in FIG. 2, the computing device 200 comprises, as a principal hardware configuration, a control unit 201, a storage device 204, a sound processing unit 205, an image processing unit 206, a communication unit 207, and a peripheral device interface 208.

The control unit 201 comprises a CPU (Central Processing Unit) 202 and a memory 203. The computing device 200 controls processing and operations of another hardware configuration to function as various function executing means by, for example, executing a predetermined software program (for example, a game software program) stored in the memory 203 and the storage device 204 by the CPU 202. That is, under the control of the control unit 201, the computing device 200 implements a game function in cooperation with another hardware by executing a predetermined program. It is noted that FIG. 2 illustrates only a principal configuration of the computing device 200, and the computing device 200 also comprises other configurations of general information processing devices.

The storage device 204 is composed of a hard disk or the like. In the storage device 204, data reading and writing are performed by the control unit 201. In the storage device 204, data such as a software program necessary for the processing in the computing device 200 is written and data as a result of the processing is written. Under the control of the control unit 201, the sound processing unit 205 performs various sound processing, and outputs data of the processing result to the speaker 101. Under the control of the control unit 201, the image processing unit 206 performs various graphics processing, and outputs data of the processing result to the display device 102. The communication unit 207 is an interface enabling communication with a server or another gaming device. The peripheral device interface 208 is an interface enabling the computing device 200 to communicate with peripheral devices such as the operation input device 103, the card reading device 104, the Bill depositing device 105, and the ticket payout device 106.

Examples of Game Content

Next, an example of the content of a game that the player can play with the gaming device 100 according to the present embodiment will be described. That game is provided by the gaming device 100 loading a game software program stored in the storage device 204 or the like on the memory 203 to execute, and then controlling the operation of various configurations of the gaming device 100, under the control of the control unit 201.

In order to start the game, the player first inserts his/her own card into the card reading device 104 of the gaming device 100, and deposits a bill or ticket into the Bill depositing device 105. When the bill or ticket is deposited, the player can possess a credit corresponding to the deposited bill and ticket in the game.

Next, the gaming device 100 causes the display device 102 to display a bet screen for the player to bet on a reel game. In response to the player's bet and start instruction, the gaming device 100 starts a slot game. Such a game that can be played by depositing a bill or the like for charge will be referred to as a "normal game" in the following description. Meanwhile, a game that can be played free of charge, i.e., without charge will be referred to as a "free game" in the following description. In the normal game or the free game, the gaming device 100 first spins (rotates) a plurality of virtual reels (for example, nine reels; hereinafter, a virtual reel is simply referred to as the "reel"), and then stops the spinning at random timing for each reel. After stopping, a part of each reel is displayed on the display device 102.

Figure 3:
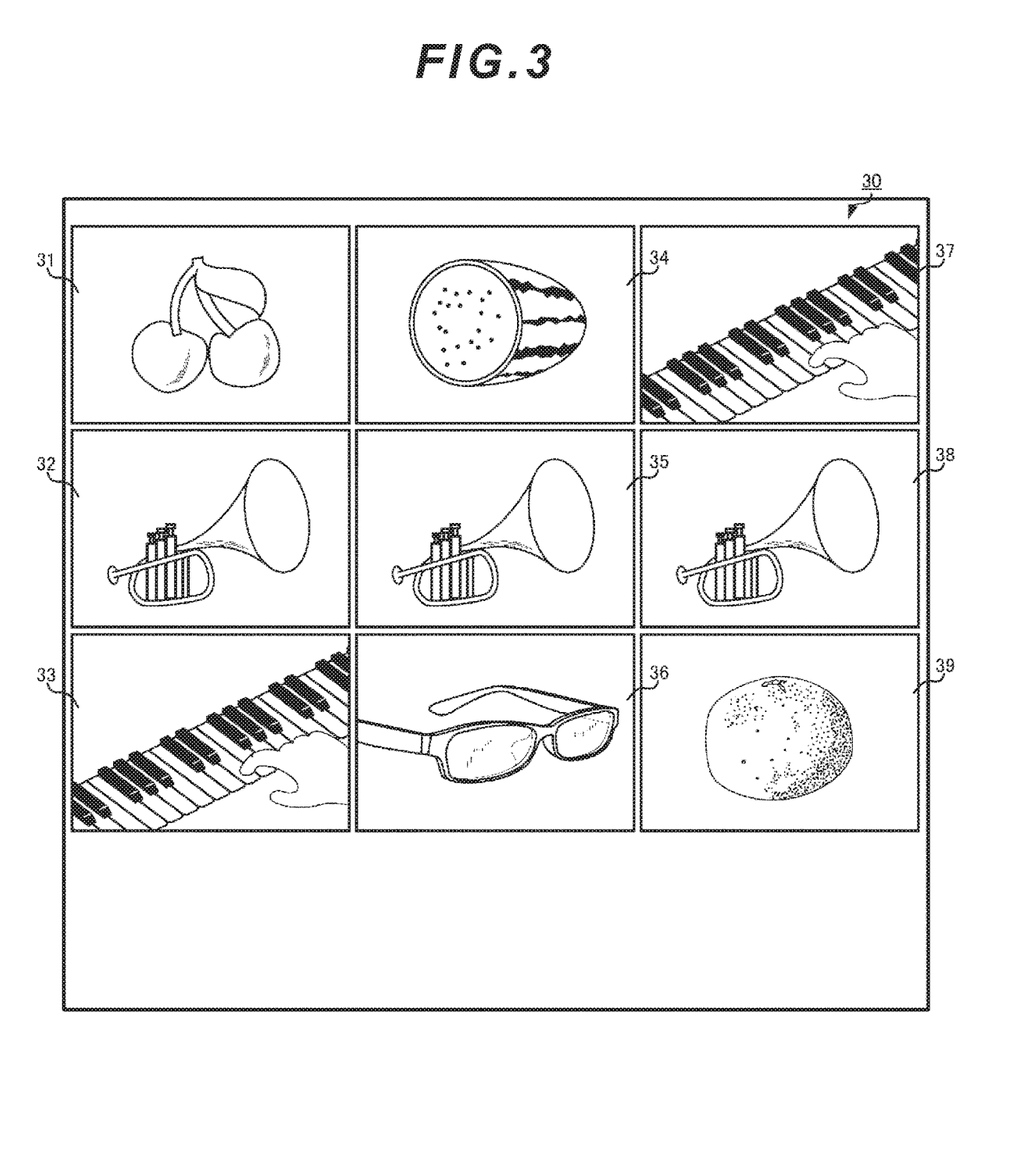
FIG. 3 is a conceptual diagram illustrating an example of a screen displayed on a display device according to one embodiment.

An exemplary screen 30 displayed on the display device 102 is illustrated in FIG. 3. On the screen 30, areas 31 to 39 are illustrated. In each of the areas 31 to 39, an example display of symbols (patterns) arranged on a part of the corresponding reel after the spinning of the reels is stopped is illustrated. In this example, one of the plurality of symbols arranged on the corresponding reel is displayed in each of the areas 31 to 39.

In this manner, after the reel spinning is stopped on the display device 102, a part of the symbols arranged on the corresponding reel is displayed in each of the areas 31 to 39. The player is awarded various privileges depending on whether or not the arrangement of displayed symbols matches a preset (or preselected) line (payline). In other words, according to the displayed symbols, it is determined whether or not the player wins (gets successful) in the game, and if winning, the player is awarded a privilege corresponding to the content of the win. Further, points (parameter values) are accumulated according to the number of predetermined symbols displayed on the display device 102 after the reel spinning is stopped, and the player is awarded various privileges according to the accumulated points.

The privileges include, but not particularly limited thereto, for example, credits and the right to play a free game being given. Further, the privileges are set as various values of a jackpot to a small win according to the arrangement and type (or accumulated points) of the displayed symbols. For example, it is possible to change the number of times the free game is allowed to be played in the right to play a free game given as a privilege according to the arrangement and type of the displayed symbols or the value of the accumulated points.

The free game will be further described. For example, when the arrangement and type of the symbols displayed on the display device 102 at the time of the stop of the spinning of the reels in the normal game satisfy a predetermined condition, the gaming device 100 shifts to a state where the free game can be played. In other words, the right to play the free game is given to the player when the arrangement of the displayed symbols and the points accumulated satisfy the predetermined condition as described above. Thereafter, the player can play the free game a predetermined number of times (for example, five times) continuously. Also in the free game, the player is awarded various privileges such as credits and retriggers according to the arrangement of the symbols or the location of a predetermined symbol after the stop of the reel spin. Here, the retrigger is a privilege that enables the free game to be played a predetermined number of times (for example, five times).

When all the free games have been played, the gaming device 100 shifts to a state where the normal game is ready to be played again. It is noted that one unit of game is defined as from when the player is allowed for betting or start instruction to when it is determined whether or not a privilege is awarded according to the stop position of the reel. After it is determined whether or not a privilege is awarded in a first game, the player is allowed for betting or start instruction on a second game subsequent to the first game.

Functional Configuration Example of Gaming Device

Next, an example of the functional configuration of the gaming device 100 of the present embodiment will be described.

Figure 4:
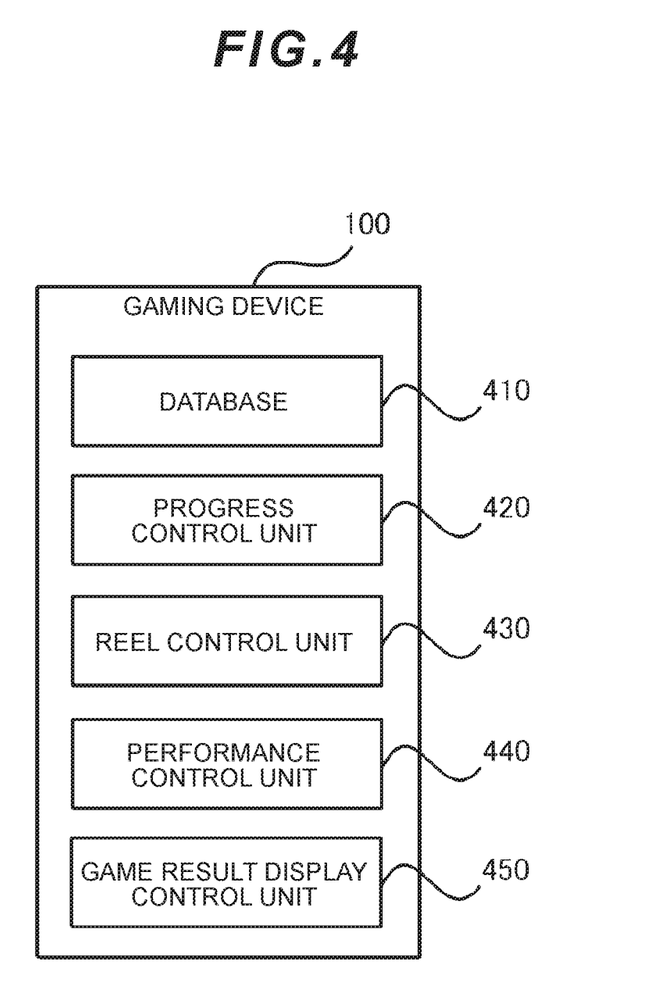
FIG. 4 is a block diagram illustrating a main functional configuration of a gaming device according to one embodiment.

FIG. 4 is a block diagram illustrating a functional configuration of the gaming device 100 of the present embodiment. As illustrated in FIG. 4, the gaming device 100 principally comprises, as a functional configuration, a database 410, a progress control unit 420, a reel control unit 430, a performance control unit 440, and a game result display control unit 450. Their functional configuration can be implemented through cooperation between the program (software) and the hardware of the gaming device 100 by, for example, loading a game software program stored in a storage unit such as the storage device 204 or the like on the memory 203 and executing the game software program by the control unit 201. It is noted that in addition to the functions illustrated in FIG. 4, the gaming device 100 has other functions of general gaming devices, but the explanation thereof will be omitted here.

The database 410 stores various information such as information necessary for processing executed in the gaming device 100 and information generated by the processing. The database 410 is, for example, a control software program for controlling progress of the game, image (for example, still image, moving image, video, etc.) data and sound data for expressing or presenting the game, data on the state of the game in progress, and the like.

The progress control unit 420 executes processing of controlling the progress of the game in accordance with operations on the gaming device 100 by the player of the game and the control software program stored in the database 410. In particular, the progress control unit 420 performs control of the progress of the normal game in the slot as described above, control of switching from the normal game to the free game, control of the progress of the free game, and control of switching from the free game to the normal game, and control of selecting/changing the reels to be spun during the game.

For example, the progress control unit 420 starts the normal game or the free game according to the player's instruction, and instructs the reel control unit 430 to control the spinning of the reels. Further, the progress control unit 420 performs control to determine the game result according to the arrangement and type of symbols displayed when the spinning of the reel is stopped.

Further, when the parameters and the like accumulated according to the symbols displayed on the display device 102 after the reel spinning is stopped in the normal game satisfy the predetermined condition, the progress control unit 420 performs control for making the free game ready to be played or giving the player a right to play the free game at a desired timing. When the free game is ready to be played, the progress control unit 420 performs control for executing the free game a predetermined number of times (for example, five times) continuously. Here, giving the player the right to play the free game specifically means, for example, to store data indicating that the target player is ready to play the free game in the database 410 according to the control of the progress control unit 420.

Further, the progress control unit 420 refers to the database 410 to determine whether or not the target player is allowed to play the free game on the basis of the data, and if the player is allowed, the progress control unit 420 controls the play of the free game.

Further, the above-described control by the progress control unit 420 is performed in accordance with processing results by the reel control unit 430, the performance control unit 440, and the game result display control unit 450, which will be described later.

The reel control unit 430 performs control of spinning and stopping of the reels in a virtual space and control of playing video of the reels on the display device 102 in a reel game. Images of a plurality of symbols comprising one or more types of symbols are arranged on the surface of each reel, and the reel control unit 430 performs control for displaying parts of the plurality of symbols on the display device 102.

While the reels spin, the reel control unit 430 displays the symbols at the position appearing by continuous scroll according to the spinning, among the symbols on the display device 102 to sequentially change the display of the display device 102. Thereafter, the reel control unit 430 performs control for stopping the spinning of the reels at a predetermined timing to stop the scroll of the display. The reel control unit 430 can, for example, randomly determine the stop position of each reel. An example of the symbols displayed on the display device 102 at the time when the spinning of the reels is stopped is as illustrated in FIG. 3.

In the case of the example illustrated in FIG. 3, the reel control unit 430 controls the spinning and stopping of the nine reels independently. Further, in FIG. 3, one symbol is displayed on the display device 102 among the plurality of symbols arranged on each reel. Therefore, in this example, the control of the reel control unit 430 causes the display device 102 to display nine symbols in total among the plurality of symbols arranged on the nine reels.

Specifically, the reel control unit 430 sequentially displays a plurality of symbols different in the respective display areas (areas 31 to 39) provided in the display device 102 to change the displays of the symbols in the plurality of display areas. Thereafter, the reel control unit 430 performs control for stopping the changes of the displays of the symbols at a predetermined timing. Thus, the reel control unit 430 functions as a symbol display control unit. The reel control unit 430 can simultaneously stop the changes of the displays of the symbols in the respective display areas, and can stop the changes of the displays at different timings.

Further, the reel control unit 430 can select the type of reels to be spun in the reel game according to a given condition or randomly. The symbol displayed on the front differ depending on the type of reel. As a result, the winning rate (wining probability) in a game changes in accordance with which type of reel is selected as the spin target. For example, it is now assumed that there are a first reel on which a first set of a plurality of symbols comprising a first symbol (for example, a symbol representing "7") is arranged, and a second reel on which a second set of a plurality of symbols comprising the first symbols more than in the first set of symbols is arranged. In this case, a reel game with the second reel has a higher possibility of winning in which the first symbols form a payline after the spinning is stopped than with the first reel. In other words, a reel game with a reel having a large number of symbols of the same type arranged (hereinafter referred to as a "second set of symbols") has a higher probability of winning than with a reel having a small number of symbols of the same type arranged (hereinafter referred to as a "first set of symbols").

The reel control unit 430 can display the same type of reel in all of the plurality of display areas (for example, the areas 31 to 39) while spinning it, and can also display a different type of reel in each of the plurality of display areas while spinning it. Therefore, it is possible to sequentially display the symbols included in the first set of symbols in some display areas, and to sequentially display the symbols included in the second set of symbols in other display areas.

The performance control unit 440 executes a performance while the reel control unit 430 changes the displays of the symbols. The performance can adopt any method. For example, the performance control unit 440 can display an image on the display device 102 for a visual effect. Further, the performance control unit 440 can cause the speaker 101 to output a sound for an auditory effect and vibrate the gaming device 100 for a tactile effect.

Further, the performance control unit 440 can perform a different performance during the changes of the displays of the symbols according to the type of reel selected as the one to be spun during a reel game by the reel control unit 430.

Examples of a method of carrying out different performances under the control of the performance control unit 440 according to the type of reels to be spun will be described with reference to FIG. 5 to FIG. 7.

Figure 5:
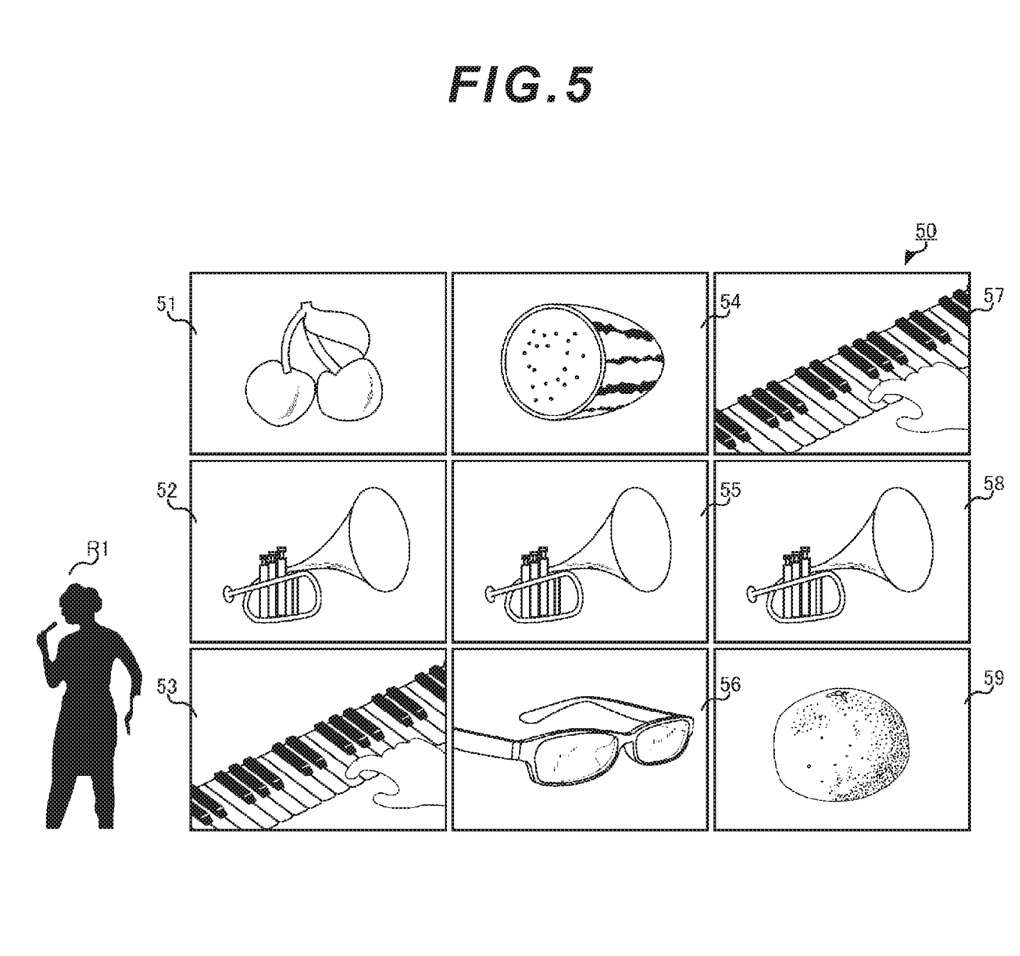
FIG. 5 is a conceptual diagram illustrating an example of a screen displayed on the display device according to one embodiment.

In FIG. 5, an exemplary screen 50 displayed on the display device 102 is illustrated. On the screen 50, areas 51 to 59 are illustrated. In each of the areas 51 to 59, an example of the display of a symbol arranged as a part of each reel being spun is illustrated. In the example of FIG. 5, it is assumed that the reel on which the second set of symbols is arranged, which is a reel having a larger number of symbols of the same type arranged than that of the first set of symbols described above, is spinning (for example, the second set of symbols has five symbols of cherry out of ten symbols, while the first set of symbols has three symbols of cherry out of ten symbols). In other words, the game with the reels spinning as illustrated in FIG. 5 has a higher probability of winning (winning rate) than the game with the reels on which the first set of symbols is arranged.

During this time, display of an image R1 on the screen 50, which is a performance not executed during the spinning of the reels with the first set of symbols, is performed by the control of the performance control unit 440 on the basis of the data stored in database 410. In this example, the image R1 is the shape of a person singing a song. The image R1 may be a still image or a moving image. In addition to the display of the image R1, the performance control unit 440 can perform control for outputting a sound from the speaker 101 or can perform control for vibrating the gaming device 100, on the basis of the data stored in the database 410.

When the type of reel used in the reel game is changed, the winning probability of the game changes depending on what symbols are displayed on the reels. Therefore, as a rule, the player sometimes judges whether or not the winning probability of the reel game being played is high by staring at the symbols displayed on the spinning reel.

Meanwhile, according to the present embodiment, the performance control unit 440 executes a predetermined performance when the reel with the second set of symbols arranged, which is a reel having a larger number of symbols of the same type arranged than that of the first set of symbols, is used to spin in the reel game, as described above. As a result, the player can more easily determine the winning probability in the game without staring at the symbols displayed on the spinning reels.

Next, with reference to FIG. 6, an example of another performance will be described. In FIG. 6, an exemplary screen 60 displayed on the display device 102 is illustrated. In the screen 60, in each of the areas 61 to 69, an example of the display of a symbol arranged as a part of each reel being spun is illustrated. In the example of FIG. 6, the reel on which the second set of symbols is arranged, which is a reel having a larger number of symbols of the same type arranged than that of the first set of symbols described above, is spinning.

Figure 6:
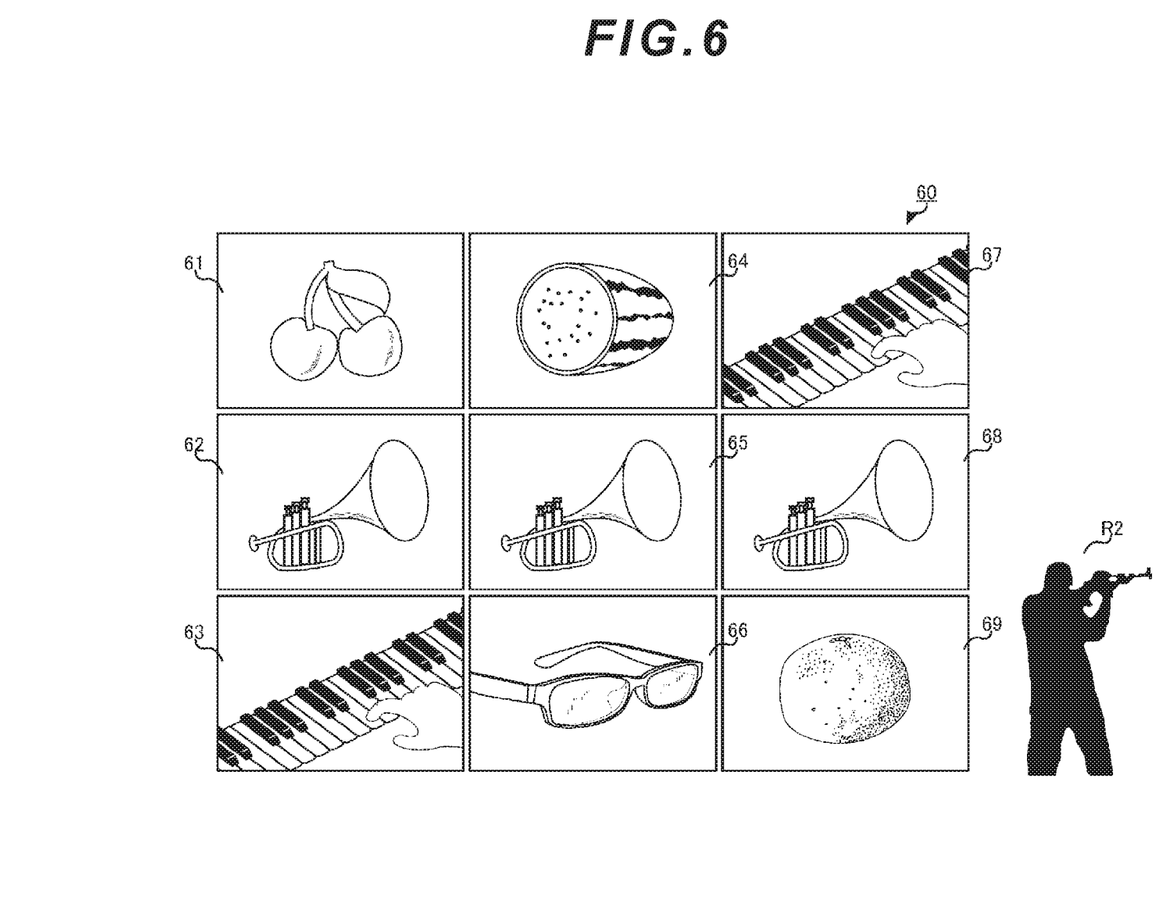
FIG. 6 is a conceptual diagram illustrating an example of a screen displayed on the display device according to one embodiment.

Further, if the ratio of the number of symbols of the same type included in the second set of symbols in the example described with reference to FIG. 5 is set to a first ratio, the ratio of the number of symbols of the same type included in the second set of symbols in the example illustrated in FIG. 6 is set to a second ratio higher than the first ratio. For example, if the set of symbols in the example of FIG. 5 has five symbols of cherry out of ten symbols, the set of symbols in the example of FIG. 6 has six symbols of cherry out of ten symbols.

During this time, in the example of FIG. 6, the performance control unit 440 performs control for displaying an image R2 on the screen 60, unlikely to the performance illustrated in FIG. 5, on the basis of the data stored in database 410. Further, the performance control unit 440 performs control for displaying the image R2 at a position (right side of the screen) different from the position (left side of the screen) at which the image R1 is displayed in FIG. 5.

In other words, according to the examples illustrated in FIG. 5 and FIG. 6, the performance control unit 440 performs control for carrying out a different performance depending on the ratio of the specific symbol included in the second set of symbols. For example, the performance control unit 440 can perform control for displaying a different type of image for performance on the screen displayed on the display device 102 depending on the ratio of the specific symbol included in the second set of symbols. Further, the performance control unit 440 can perform control for displaying an image for performance at a different position in the screen depending on the ratio of the specific symbol included in the second set of symbols.

Next, with reference to FIG. 7, an example of another performance will be described. In FIG. 7, an exemplary screen 70 displayed on the display device 102 is illustrated. In the screen 70, in each of the areas 71 to 79, an example of the display of a symbol arranged as a part of each reel being spun is illustrated. In the example of FIG. 7, the reel on which the second set of symbols is arranged, which is a reel having a larger number of symbols of the same type arranged than that of the first set of symbols described above, is spinning.

Figure 7:
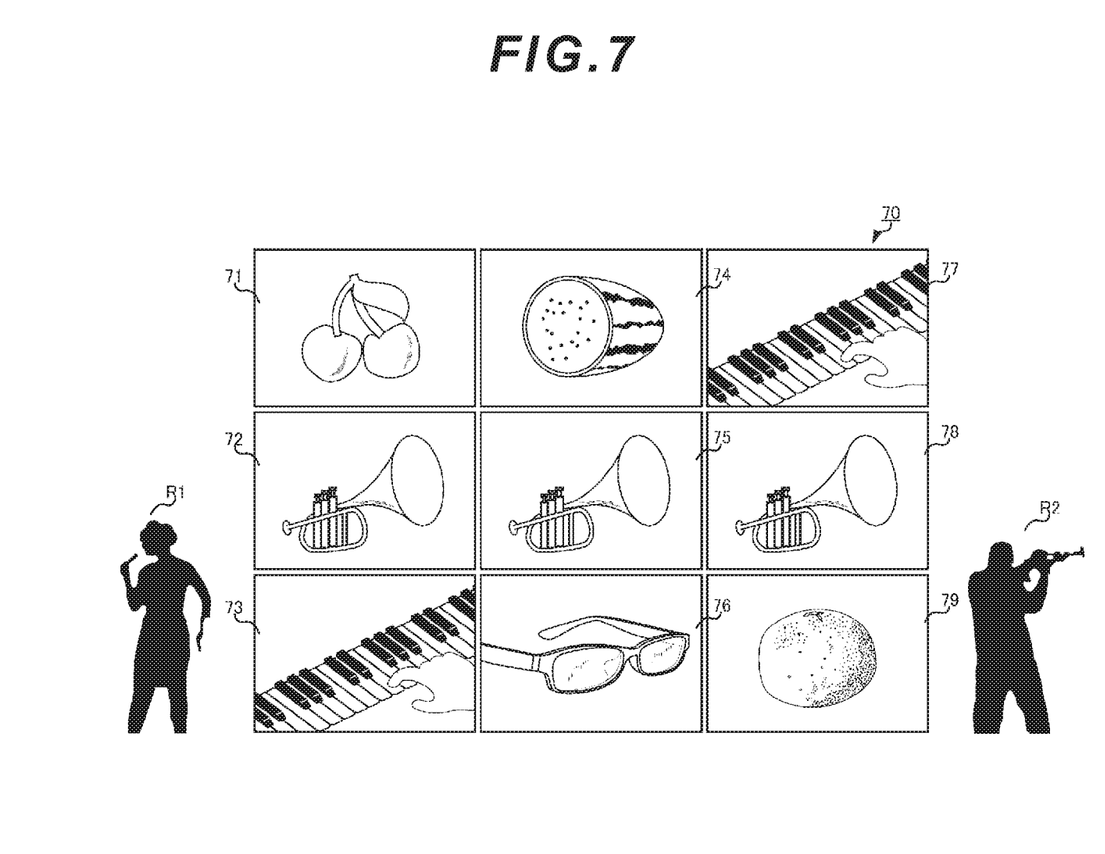
FIG. 7 is a conceptual diagram illustrating an example of a screen displayed on the display device according to one embodiment.

Further, if the ratios of the number of symbols of the same type included in the second set of symbols in the examples of FIG. 5 and FIG. 6 are set to the first ratio and the second ratio, respectively, the ratio of the number of symbols of the same type included in the second set of symbols in the example illustrated in FIG. 7 is set to a third ratio higher than each of the first ratio and the second ratio. For example, if the sets of symbols in the examples of FIG. 5 and FIG. 6 have five symbols of cherry and six symbols of cherry out of ten symbols, respectively, the set of symbols in the example of FIG. 7 has seven symbols of cherry out of ten symbols.

During this time, in the example of FIG. 7, the performance control unit 440 performs control for displaying both the image R1 and the image R2 on the screen 70, which is different from the respective performances illustrated in FIG. 5 and FIG. 6, on the basis of the data stored in database 410.

In other words, according to the example illustrated in FIG. 7, the performance control unit 440 performs control for displaying a different number of images for performance depending on the ratio of the specific symbol included in the second set of symbols. For example, as the ratio of the specific symbol is higher, the performance control unit 440 can perform control for displaying a larger number of images.

Further, the performance control unit 440 can execute the above performances at a predetermined probability (for example, 10%) even in a game with a reel on which the first set of symbols is arranged to spin. In other words, a performance can be executed at a constant rate not only in the game using the second set of symbols in which the game winning rate is high but also in the game using the first set of symbols in which the game winning rate is not high.

Further, the performance control unit 440 can notify the player that the symbols displayed in the plurality of display areas of the display device 102 after the changes of the displays of the symbols are stopped (that is, after the spinning of the reels is stopped) have a high probability that the winning condition is satisfied. For example, the performance control unit 440 determines whether or not the symbols displayed in the display area satisfy the winning condition before the spinning of the reels is stopped. Thereafter, the performance control unit 440 always provides a notification when it is determined that the winning condition is satisfied, and can notify that there is a high possibility of satisfying the winning condition by occasionally providing the notification (for example, once in 10 times) even when it is not determined that the winning condition is satisfied. The notification can be provided, for example, while the reels are spinning. The notification can be provided by any method, for example, by displaying a message or an image on the display device 102 or outputting a sound from the speaker 101.

Further, when a different type of reel is spun in each of the plurality of display areas of the display device 102 to sequentially display the symbols, the performance control unit 440 can execute a different performance depending on the number of display areas in which the symbols included in the second set of symbols are displayed out of the plurality of display areas. For example, the performance control unit 440 can perform control for carrying out a more dramatic performance as the number of display areas in which the symbols included in the second set of symbols are displayed is larger.

The explanation of FIG. 4 is returned back. The game result display control unit 450 performs control for displaying the result of the game on the display device 102. As the result of the game, for example, either whether or not a privilege is awarded or the content of the privilege to be awarded is displayed. The result of the game is determined by the progress control unit 420, for example, depending on whether or not the arrangement of the symbols displayed in the plurality of display areas of the display device 102 after the spinning of the reels is stopped matches a preset (or selected) line (payline). When the arrangement of the symbols matches the preset payline, the player is awarded a predetermined privilege.

Processing Flow

Figure 8:
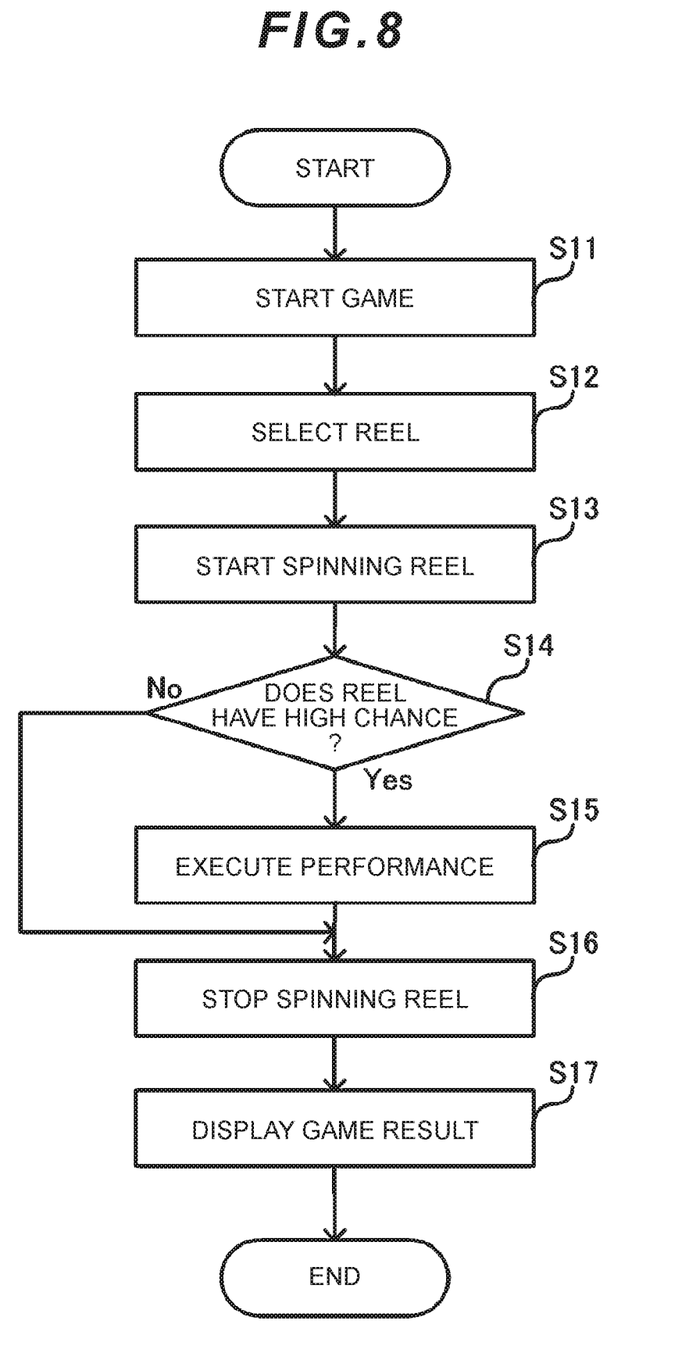
FIG. 8 is a flowchart for describing processing by the gaming device according to one embodiment.

Next, with reference to FIG. 8, a flow of an example of performance processing in a reel game among processing executed in the gaming device 100 will be described.

This processing can be executed through cooperation between the program (software) and the hardware of the gaming device 100 by, for example, loading a software program stored in the storage device 204 or the like on the memory 203 and executing the software program by the control unit 201. It is noted that the processing steps included in the processing flow described below can be performed in any order while changing the order or can be performed in parallel as long as there is no contradiction in the processing content. Further, another step may be added between the processing steps as long as there is no contradiction in the processing content. Further, while the step described as one step for convenience can be divided into a plurality of steps to be executed, those described as a plurality of divided steps for convenience can be considered as one step. The details of the processes of the respective processing steps are omitted here because they are already described.

First, in step S11, the control unit 201 starts the execution of a reel game in response to the player inserting bet money and instructing an operation for the game in the gaming device 100, and progresses the game. That is, the control unit 201 manages the execution of the game. Thereafter, the processing proceeds to step S12. It is noted that the reel game may be the normal game or the free game. If it is the free game, it is not necessary to insert bet money for the start.

In step S12, the control unit 201 selects a reel to be used in the started reel game on the basis of the data read from the storage device 204. The selection of the reel may be performed according to a predefined condition or may be performed randomly. That is, the reel is selected in accordance with a predetermined condition. In the present embodiment, there are provided reels comprising a reel having a normal winning rate and a reel having a higher winning rate than the normal rate. On the reel having the normal winning rate, a first set of a plurality of symbols comprising a first symbol (for example, a symbol representing "7") is arranged, and on the reel having the higher winning rate than the normal rate, a second set of a plurality of symbols comprising the first symbols more than in the first set of symbols is arranged. Further, regarding the selection of the reel, one type of reel may be selected to be displayed in each of the plurality of display areas provided in the display device 102, or different types of reels are selected to be displayed in the respective display areas. Thereafter, the processing proceeds to step S13.

In step S13, the control unit 201 starts the spinning of the reels selected in step S12. Specifically, the control unit 201 sequentially displays a plurality of symbols different in the respective display areas provided in the display device 102 on the basis of the data read from the storage device 204, thereby changing the displays of the symbols in the plurality of display areas. Thereafter, the processing proceeds to step S14.

In step S14, the control unit 201 determines whether or not the reel selected in step S12 is the reel with a higher winning rate than the normal winning rate (i.e., the reels on which the second set of symbols is arranged) (or comprises the reel with a higher winning rate than the normal winning rate). If it is determined that it has the higher winning rate (Yes in S14), the processing proceeds to step S15, and if it is determined that it does not have (No in S14), the processing proceeds to step S16.

In step S15, during the symbols included in the second set of symbols being sequentially displayed in each of the plurality of display areas provided in the display device 102, the control unit 201 executes a performance on the basis of the data read from storage device 204. The start of the performance may be simultaneous with the start of the reel spinning in step S13, or may be after a predetermined time has elapsed from the start of the spinning (for example, two seconds later from the start of the spinning). Further, the control unit 201 executes different performances according to the ratio of a specific symbol (the ratio of the same symbol) included in the second set of symbols arranged on the reel selected in step S12. The detail of the processing for the performance is omitted here because it is already described. Thereafter, the processing proceeds to step S16.

In step S16, the control unit 201 stops the changes of the displays of the symbols at a predetermined timing. The control unit 201 writes, in the storage device 204, data of the symbols displayed in the respective display areas when the changes of the displays are stopped. Thereafter, the processing proceeds to step S17.

In step S17, the control unit 201 displays a result of the game according to the symbols displayed in the respective display areas on the display device 102. Thereafter, the processing illustrated in FIG. 8 ends.

According to the present embodiment, a predetermined performance is executed when the reel with the second set of symbols arranged, which is a reel having a larger number of symbols of the same type arranged than that of the first set of symbols arranged on the reel having the normal winning rate, is used to spin in the reel game. As a result, the player can more easily determine the winning probability in the game without staring at the symbols displayed on the spinning reels.

Example of Modification

The present disclosure is not limited to the above embodiment, and various other modifications can be made within the range not departing from the scope of the disclosure. That is, the above-described embodiment is merely illustrative in all respects and is not construed as limiting, and various modifications can be adopted.

For example, in the above embodiment, with reference to FIG. 5 to FIG. 7, the performances have been described when the ratio of the number of symbols of the same type included in the second set of symbols is the first ratio, the second ratio or the third ratio (i.e., the respective performances for three types of sets of symbols). However, the type of set of symbols and the way of performance are not limited to the above, and four or more types of sets of symbols having different ratios of the same type of symbol may be set as being able to be arranged on the reel of a reel game.

Further, a program for implementing each embodiment of the present disclosure described above may be stored in a recording medium. Using this recording medium makes it possible to install the above program in a computer. Here, the recording medium storing the program may be a non-transitory recording medium. The non-transitory recording medium is not particularly limited, but it may be a recording medium such as a CD-ROM, for example.

LIST OF REFERENCE NUMERALS

100 Gaming device
101 Speaker
102 Display device
103 Operation input device
104 Card reading unit
105 Bill depositing device
106 Ticket payout device
201 Control unit
202 CPU
203 Memory
204 Storage device
205 Sound processing unit
206 Image processing unit
207 Communication unit
208 Peripheral device interface

What is claimed is:

1. A gaming device, comprising a control unit and a storage unit, wherein the control unit is configured to implement, by executing a program stored in the storage unit, sequentially displaying symbols included in a first set of a plurality of symbols including a specific symbol in each of a plurality of display areas to change displays of the symbols in the plurality of display areas, and stopping the changes of the displays of the symbols at a predetermined timing;

sequentially displaying, when a predetermined condition is satisfied, symbols included in a second set of a plurality of symbols including the specific symbol in a higher proportion than in the first set of symbols in each of the plurality of display areas to change displays of the symbols in the plurality of display areas, and stopping the changes of the displays of the symbols at a predetermined timing;

executing a predetermined performance when the symbols included in the second set of symbols are sequentially displayed, and executing the performance at a predetermined probability when the symbols included in the first set of symbols are sequentially displayed.

2. The gaming device according to claim 1, wherein executing the performance includes executing a different performance depending on a ratio of the specific symbol included in the second set of symbols.

3. The gaming device according to claim 1, wherein executing the performance includes displaying a different type of image for performance depending on a ratio of the specific symbol included in the second set of symbols.

4. The gaming device according to claim 1, wherein the control unit is configured to implement, by executing a program stored in the storage unit, sequentially displaying the symbols included in the second set of symbols in each of at least one or some display areas out of the plurality of display areas, and executing the performance includes executing a different performance depending on the number of display areas in which the symbols included in the second set of symbols are arranged out of the plurality of display areas.

5. The gaming device according to claim 1, comprising notifying that the symbols displayed in the plurality of display areas after the changes of the displays of the symbols are stopped have a high probability that a winning condition is satisfied.

6. A game control method implemented in a gaming device including a control unit and a storage unit, the method comprising: by the control unit executing a program stored in the storage unit, sequentially displaying symbols included in a first set of a plurality of symbols including a specific symbol in each of a plurality of display areas to change displays of the symbols in the plurality of display areas, and stopping the changes of the displays of the symbols at a predetermined timing;

sequentially displaying, when a predetermined condition is satisfied, symbols included in a second set of a plurality of symbols including the specific symbol in a higher proportion than in the first set of symbols in each of the plurality of display areas to change displays of the symbols in the plurality of display areas, and stopping the changes of the displays of the symbols at a predetermined timing;

executing a predetermined performance when the symbols included in the second set of symbols are sequentially displayed, and executing the performance at a predetermined probability when the symbols included in the first set of symbols are sequentially displayed.

7. A non-transitory recording medium storing a program for implementing a game control method in a gaming device including a control unit, the game control method comprising: by the control unit executing the program, sequentially displaying symbols included in a first set of a plurality of symbols including a specific symbol in each of a plurality of display areas to change displays of the symbols in the plurality of display areas, and stopping the changes of the displays of the symbols at a predetermined timing;

sequentially displaying, when a predetermined condition is satisfied, symbols included in a second set of a plurality of symbols including the specific symbol in a higher proportion than in the first set of symbols in each of the plurality of display areas to change displays of the symbols in the plurality of display areas, and stopping the changes of the displays of the symbols at a predetermined timing;

executing a predetermined performance when the symbols included in the second set of symbols are sequentially displayed, and executing the performance at a predetermined probability when the symbols included in the first set of symbols are sequentially displayed.

* * * * *